(12) United States Patent
Michaut et al.

(10) Patent No.: US 11,776,096 B2
(45) Date of Patent: Oct. 3, 2023

(54) IMAGE PROCESSING CIRCUIT, CIRCUIT DEVICE, AND ELECTRONIC APPARATUS

(71) Applicant: Seiko Epson Corporation, Tokyo (JP)

(72) Inventors: Loic Remi Robert Christian Michaut, Richmond (CA); Hideki Matsuda, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/704,150

(22) Filed: Mar. 25, 2022

(65) Prior Publication Data
US 2022/0309629 A1     Sep. 29, 2022

(30) Foreign Application Priority Data

Mar. 26, 2021   (JP) ................................. 2021-052918

(51) Int. Cl.
| | | |
|---|---|---|
| *G06T 5/00* | (2006.01) | |
| *G06T 5/40* | (2006.01) | |
| *G09G 3/20* | (2006.01) | |

(52) U.S. Cl.
CPC ............... *G06T 5/009* (2013.01); *G06T 5/40* (2013.01); *G09G 3/2007* (2013.01); *G09G 2320/0276* (2013.01); *G09G 2380/10* (2013.01)

(58) Field of Classification Search
CPC ................. G09G 3/002; G09G 3/2007; G09G 2320/0276; G09G 3/20; G09G 2380/10; G09G 2360/16; G09G 5/00; G06T 5/009; G06T 5/007; G06T 5/40; G06T 7/90
See application file for complete search history.

(56) References Cited

U.S. PATENT DOCUMENTS

| | | | | |
|---|---|---|---|---|
| 6,493,462 B1 * | 12/2002 | Inoue | ............... | H04N 1/00875 358/522 |
| 6,621,923 B1 * | 9/2003 | Gennetten | ............ | H04N 1/6094 358/506 |
| 6,967,660 B2 * | 11/2005 | Sasaki | ...................... | G06T 5/40 345/589 |
| 7,715,052 B2 * | 5/2010 | Holub | ..................... | H04N 1/60 358/1.9 |
| 9,955,084 B1 * | 4/2018 | Haynold | ............... | H04N 23/741 |
| 2013/0242132 A1 * | 9/2013 | Suzuki | ................... | H04N 23/88 348/223.1 |
| 2016/0173726 A1 * | 6/2016 | Ubillos | ................ | G06F 3/0485 715/838 |

(Continued)

FOREIGN PATENT DOCUMENTS

JP          2009-225349 A      10/2009

*Primary Examiner* — Phi Hoang
(74) *Attorney, Agent, or Firm* — Harness, Dickey & Pierce, P.L.C.

(57) ABSTRACT

The image processing circuit includes a gamma correction circuit configured to perform a gamma correction on input image data using a look-up table, and then output output image data, an output image histogram calculation circuit configured to calculate an output image histogram, an input image histogram calculation circuit configured to calculate an input image histogram, a reference histogram calculation circuit configured to calculate a reference histogram from the input image histogram based on the look-up table, and a histogram comparison circuit configured to perform a comparison between the output image histogram and the reference histogram.

10 Claims, 10 Drawing Sheets

(56) References Cited

U.S. PATENT DOCUMENTS

2017/0109864 A1\* 4/2017 Ohba ................... G06T 3/4015
2021/0250518 A1\* 8/2021 Nashizawa ............ H04N 23/76
2021/0368086 A1\* 11/2021 Talbert ................ H04N 13/204
2022/0174268 A1\* 6/2022 Dubey ...................... B60R 1/00

\* cited by examiner

IMAGE PROCESSING CIRCUIT, CIRCUIT DEVICE, AND ELECTRONIC APPARATUS

The present application is based on, and claims priority from JP Application Serial Number 2021-052918, filed Mar. 26, 2021, the disclosure of which is hereby incorporated by reference herein in its entirety.

BACKGROUND

1. Technical Field

The present disclosure relates to an image processing circuit, a circuit device, an electronic apparatus, and so on.

2. Related Art

In JP-A-2009-225349 (Document 1), there are disclosed a video signal processing device, a display device, and a video signal processing method for calculating an amount of a gamma correction of improving visibility and contrast-feeling based on an average luminance value obtained from a histogram in order to perform the gamma correction on a video signal having a histogram in which the number of pixels is eccentrically-located at the white side and the black side.

In the technology of Document 1 described above, it is not possible for the video signal processing device to determine whether or not the gamma correction itself has been performed normally. Therefore, there is a possibility that even when abnormal display is performed due to an erroneous gamma correction, the abnormal display remains uncorrected until a human looks at the picture to recognize the abnormality.

SUMMARY

An aspect of the present disclosure relates to an image processing circuit including a gamma correction circuit configured to perform a gamma correction on input image data using a look-up table, and then output output image data, an output image histogram calculation circuit configured to calculate an output image histogram as a histogram of the output image data, an input image histogram calculation circuit configured to calculate an input image histogram as a histogram of the input image data, a reference histogram calculation circuit configured to calculate a reference histogram as an expected value of the output image histogram from the input image histogram based on the look-up table, and a histogram comparison circuit configured to perform a comparison between the output image histogram and the reference histogram to determine whether or not the gamma correction by the gamma correction circuit is normal.

Further, another aspect of the present disclosure relates to a circuit device including the image processing circuit described above.

Further, still another aspect of the present disclosure relates to an electronic apparatus including the image processing circuit described above.

DESCRIPTION OF AN EXEMPLARY EMBODIMENT

A preferred embodiment of the present disclosure will hereinafter be described in detail. It should be noted that the present embodiment described hereinafter does not unreasonably limit the content as set forth in the appended claims, and all of the constituents described in the present embodiment are not necessarily essential constituents.

1. Image Processing Circuit

Figure 1:
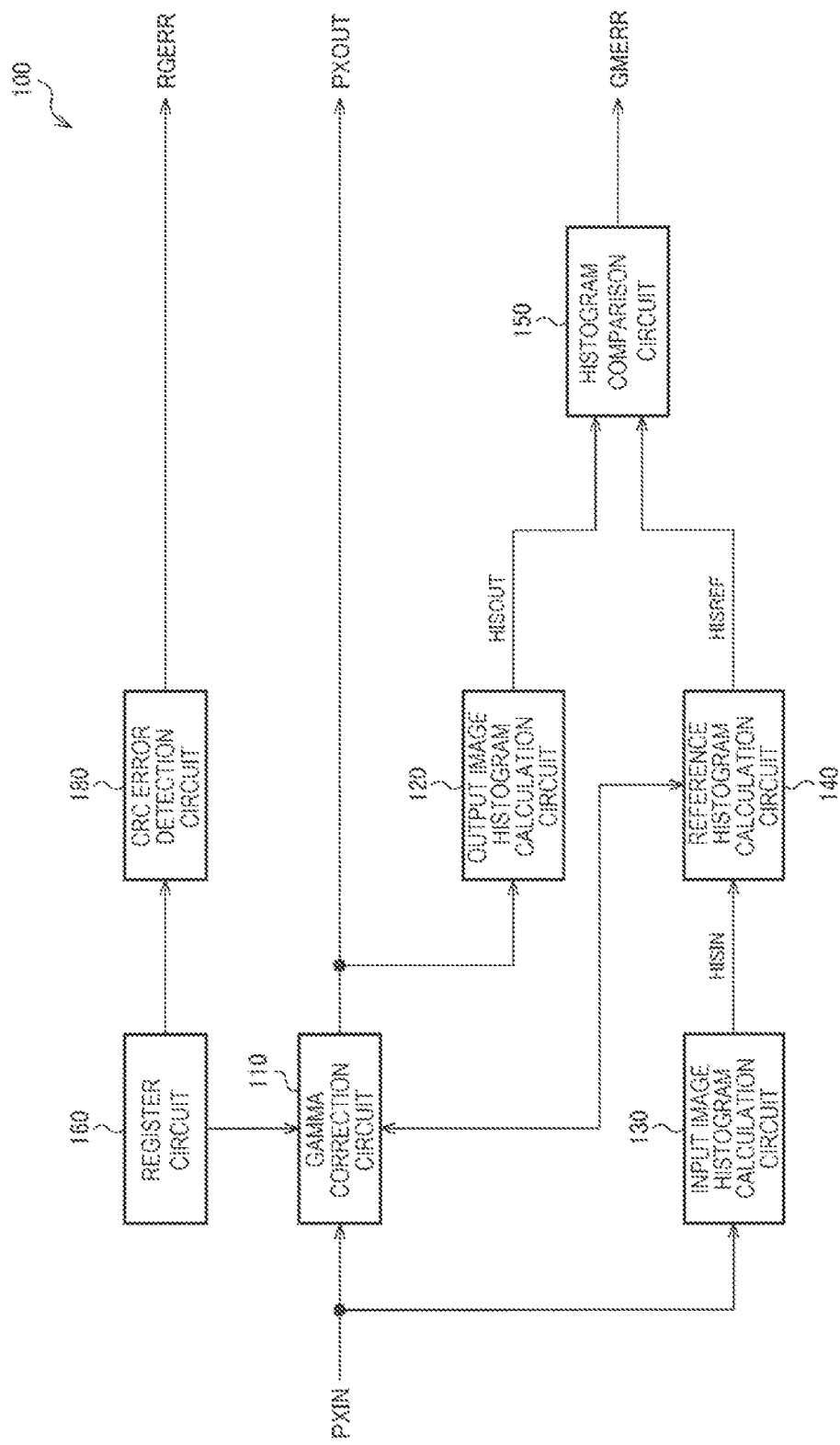
FIG. 1 is a diagram showing a configuration example of an image processing circuit.

FIG. 1 shows a configuration example of an image processing circuit 100 according to the present embodiment. The image processing circuit 100 includes a gamma correction circuit 110, an output image histogram calculation circuit 120, an input image histogram calculation circuit 130, a reference histogram calculation circuit 140, a histogram comparison circuit 150, a register circuit 160, and a CRC error detection circuit 180. "CRC" is an abbreviation of Cyclic Redundancy Check.

The image processing circuit 100 is constituted by a logic circuit. For example, circuits included in the image processing circuit 100 can each be formed of an individual logic circuit. Alternatively, it is possible to adopt a configuration in which the image processing circuit 100 is a processor such as a DSP, a program or an instruction set in which the functions of the circuits are described are stored in a memory not shown, and the functions of the circuits are realized by the processor executing the program or the instruction set. "DSP" is an abbreviation of Digital Signal Processor.

Figure 2:
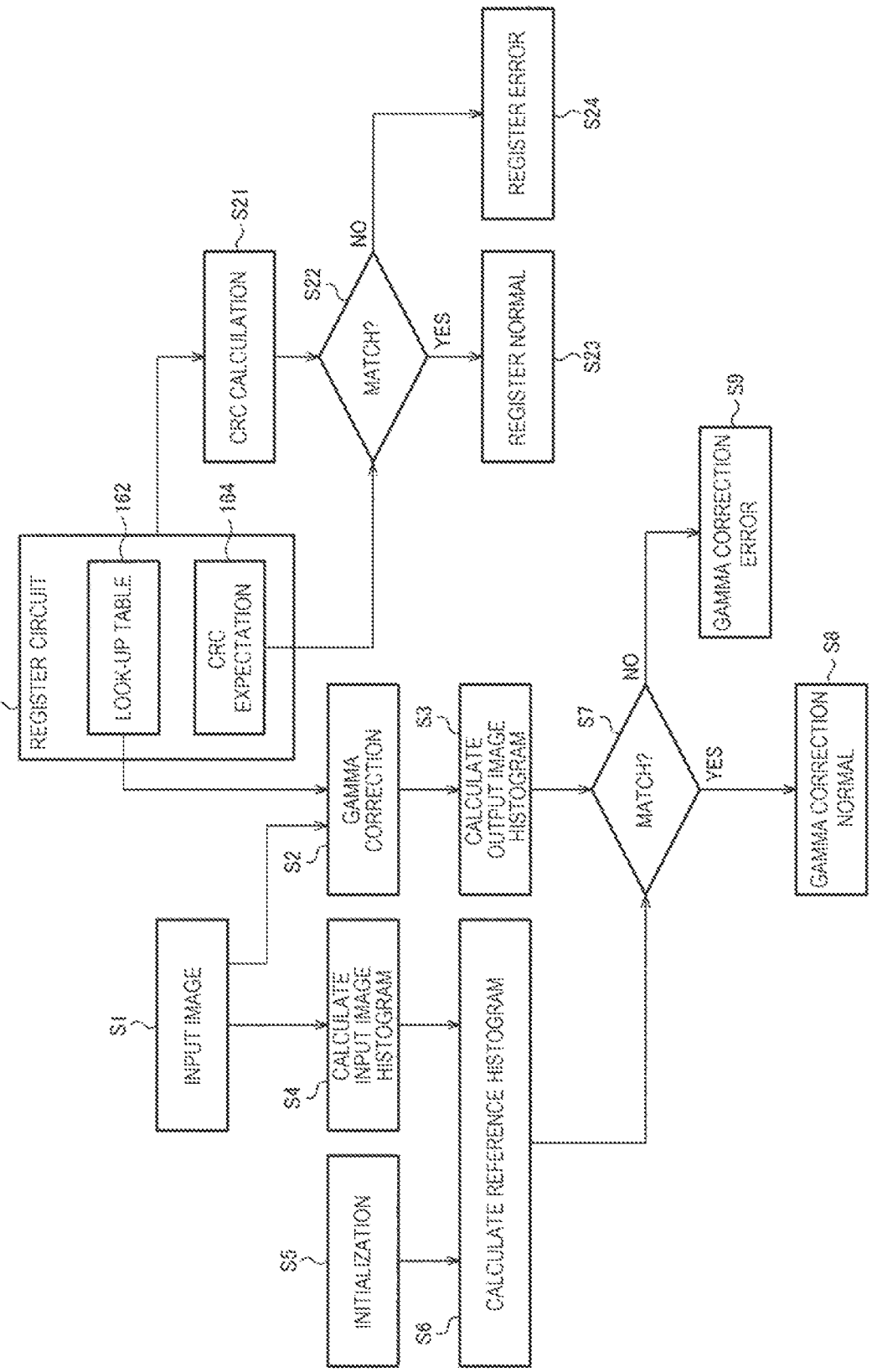
FIG. 2 is a flowchart of processing executed by the image processing circuit.

FIG. 2 is a flowchart of processing executed by the image processing circuit 100. As indicated by S1, input image data PXIN on which the gamma correction has not been performed is input to the gamma correction circuit 110 and the input image histogram calculation circuit 130. The image processing circuit 100 performs the processing in S2 through S9 described below for every input image data PXIN corresponding to one frame, or every input image data PXIN corresponding to one horizontal scanning line. It should be noted that it is possible for the image processing circuit 100 to be configured so as to perform the processing in S2 through S9 described below for every input image data PXIN corresponding to a plurality of frames, or every input image data PXIN corresponding to a plurality of horizontal scanning lines.

As indicated by S2, the gamma correction circuit 110 loads a loop-up table 162 stored in the register circuit 160 into a memory or a register in the gamma correction circuit 110. The gamma correction circuit 110 performs the gamma correction on the input image data PXIN using the look-up table 162 thus loaded, and then outputs an output image data PXOUT on which the gamma correction has been performed. The look-up table 162 is a table describing a conversion of a grayscale value in the gamma correction, and is a table in which the grayscale value before the correction and the grayscale value after the correction are made to correspond to each other. The gamma correction circuit 110 coverts the grayscale value of each of the pixels in the input image data PXIN using the look-up table 162 to thereby obtain the grayscale value of each of the pixels in the output image data PXOUT.

As indicated by S3, the output image histogram calculation circuit 120 calculates an output image histogram HISOUT which is a histogram of the output image data PXOUT. The histogram represents a distribution of the grayscale value in an image. In other words, the histogram is what represents the number of pixels having a certain color and a certain grayscale value with respect to each of the colors and each of the grayscale values of the image. The number of pixels corresponding to the certain color and the certain grayscale value is a single histogram datum, and the single histogram datum is also called a bin.

As indicated by S4, the input image histogram calculation circuit 130 calculates an input image histogram HISIN which is a histogram of the input image data PXIN.

As indicated by S5, the reference histogram calculation circuit 140 initializes a reference histogram HISREF calculated in S6. Specifically, the number of the pixels corresponding to each of the grayscale values in the reference histogram HISREF is initialized into zero.

As indicated by S6, the reference histogram calculation circuit 140 calculates the reference histogram HISREF as an expected value of the output image histogram HISOUT from the input image histogram HISIN. The reference histogram HISREF is a histogram theoretically obtained as the expected value of the output image histogram HISOUT, and is a histogram which coincides with the output image histogram HISOUT unless there is an abnormality in the processing in the image processing circuit 100. The reference histogram HISREF is the same in size as the output image histogram HISOUT. For example, when the image data of each of colors of RGB is 8-bit data, each of the reference histogram HISREF and the output image histogram HISOUT has 3×256 bins. The reference histogram calculation circuit 140 converts the input image histogram HISIN based on the look-up table 162 to thereby calculate the reference histogram HISREF. More specifically, the reference histogram calculation circuit 140 converts each of the grayscale values using the look-up table 162, and accumulates the number of the pixels corresponding to the grayscale value which has not been converted in the input image histogram HISIN as the number of the pixels corresponding to the grayscale value which has been converted in the reference histogram HISREF.

As indicated by S7, the histogram comparison circuit 150 compares the output image histogram HISOUT and the reference histogram HISREF with each other to determine whether or not the output image histogram HISOUT and the reference histogram HISREF match each other, and then outputs the determination result as a gamma correction error signal GMERR.

As indicated by S8, when the output image histogram HISOUT and the reference histogram HISREF match each other, the histogram comparison circuit 150 determines that the gamma correction has been performed normally.

As indicated by S9, when the output image histogram HISOUT and the reference histogram HISREF do not match each other, the histogram comparison circuit 150 determines that an error occurs in the gamma correction. The fact that the output image histogram HISOUT and the reference histogram HISREF do not match each other suggests that a transient error has occurred in any one of a logic related to the gamma correction, a logic related to the reference histogram calculation, and the look-up table 162 stored in the register circuit 160.

As indicated by S21, the CRC error detection circuit 180 calculates a CRC value from the data stored in the register circuit 160. The data stored in the register circuit 160 includes the look-up table 162. The CRC value obtained in S21 is called a calculated CRC value.

As indicated by S22, the CRC error detection circuit 180 determines whether or not the calculated CRC value and an expected CRC value 164 stored in the register circuit 160 match each other, and then outputs the determination result as a CRC error signal RGERR.

As indicated by S23, when the calculated CRC value and the expected CRC value 164 match each other, the CRC error detection circuit 180 determines that the data stored in the register circuit 160 is normal.

As indicated by S24, when the calculated CRC value and the expected CRC value 164 do not match each other, the CRC error detection circuit 180 determines that an error occurs in the data stored in the register circuit 160. The fact that the calculated CRC value and the expected CRC value 164 do not match each other suggests that a permanent error has occurred in the data stored in the register circuit 160.

As described hereinabove, the gamma correction error detection using the histogram indicated by S1 through S9, and the register error detection using CRC indicated by S21 through S24 are executed in parallel to each other. It should be noted that the gamma correction error detection and the register error detection are not required to be performed at the same timing, and can be performed at respective timings independent of each other. As described later, the gamma correction error detection is performed in a blanking period. The register error detection can be performed, for example, periodically, or can be performed at the time of start-up or the like of the image processing circuit 100.

When an abnormality occurs in the look-up table 162, the gamma correction is not performed normally, but when the abnormality in the look-up table 162 can be detected using the CRC, it is possible to detect an abnormality in the gamma correction. However, when a transient abnormality occurs in the look-up table 162 between the CRCs performed periodically, the abnormality cannot be detected with the CRC. Further, the CRC checks the register data, and therefore, cannot perform a dynamic verification when performing the image processing. In other words, the CRC cannot detect a logical error occurring in the gamma correction process itself. It should be noted that the transient abnormality means an abnormality which temporarily occurs due to noise, an electromagnetic wave, radiation or the like, and then returns to normal.

In the present embodiment, the image processing circuit 100 includes the gamma correction circuit 110, the output image histogram calculation circuit 120, the input image histogram calculation circuit 130, the reference histogram calculation circuit 140, and the histogram comparison circuit 150. The gamma correction circuit 110 performs the gamma correction on the input image data PXIN using the look-up table 162, and then outputs the output image data PXOUT. The output image histogram calculation circuit 120 calculates the output image histogram HISOUT as the histogram of the output image data PXOUT. The input image histogram calculation circuit 130 calculates the input image histogram HISIN as the histogram of the input image data PXIN. Based on the look-up table 162, the reference histogram calculation circuit 140 calculates the reference histogram HISREF as the expected value of the output image histogram HISOUT from the input image histogram HISIN. The histogram comparison circuit 150 performs comparison between the output image histogram HISOUT and the reference histogram HISREF to thereby determine whether or not the gamma correction by the gamma correction circuit 110 is normal.

According to the present embodiment, since the output image histogram HISOUT is calculated from the output image data PXOUT on which the gamma correction has been performed, and the reference histogram HISREF is calculated from the input image histogram HISIN, the output image histogram calculation and the reference histogram calculation are different in signal processing path from each other. Thus, when an abnormality occurs in either of the gamma correction process and the reference histogram calculation, the output image histogram HISOUT and the reference histogram HISREF fail to match each other, and therefore, the abnormality can be detected. Since the detection can dynamically be performed in the gamma correction process on the display image, whether or not the display image has normally been processed can be verified when operating.

Further, in the present embodiment, the image processing circuit 100 includes the register circuit 160 for storing the look-up table 162, and the CRC error detection circuit 180 for detecting the CRC error of the look-up table 162 stored in the register circuit 160.

When a permanent error has occurred in the look-up table 162, the gamma correction and the reference histogram calculation performed based on the look-up table 162 both become abnormal, and there is a possibility that the output image histogram HISOUT and the reference histogram HISREF become the same although abnormal. According to the present embodiment, by the CRC error in the look-up table 162 being detected, it is possible to detect the permanent error in the look-up table 162. It should be noted that the permanent error means an error which is not automatically restored to the normal state after an abnormality occurs in the content of the look-up table 162, and means an error caused by a hardware abnormality such as a short circuit.

As described hereinafter, the image processing circuit 100 according to the present embodiment can be applied to, for example, functional safety of a vehicle. It should be noted that the image processing circuit 100 can be applied to a variety of image processing apparatuses for performing the gamma correction.

The automobile industry rapidly evolves, and in order to ensure the reliability of the product and the safety of the user, the safety aspect increasingly gathers attention. In the display of an intended purpose of the vehicle, it is inevitable for a reliable display image to be provided to the user. Therefore, it is inevitable to perform display high in safety so that importable information is appropriately provided to the user. In this regard, according to the present embodiment, it is possible to ensure that the image data correction which is performed for the display has correctly been performed. In other words, the image processing circuit 100 according to the present embodiment is capable of examining whether or not the function of the gamma correction is normal in the normal operation of the image processing in order to achieve the safety target. The image processing circuit 100 according to the present embodiment is capable of detecting both of a transient malfunction and a permanent error in the gamma correction look-up table.

2. Detailed Configuration Example

Figure 3:
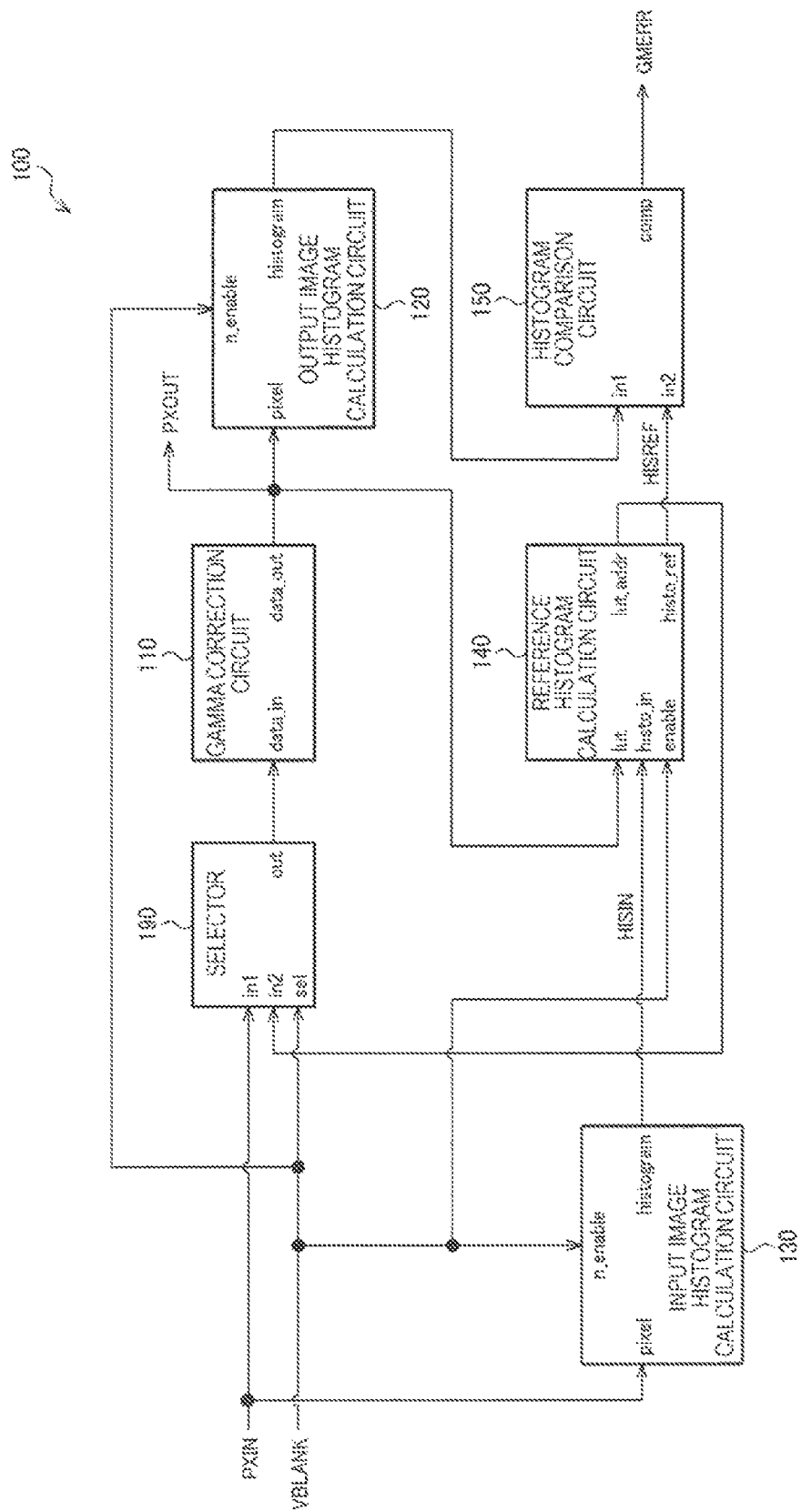
FIG. 3 is a diagram showing a first detailed configuration example of the image processing circuit.

FIG. 3 shows a first detailed configuration example of the image processing circuit 100. The image processing circuit 100 includes the gamma correction circuit 110, the output image histogram calculation circuit 120, the input image histogram calculation circuit 130, the reference histogram calculation circuit 140, the histogram comparison circuit 150, the register circuit 160, the CRC error detection circuit 180, and a selector 190. In FIG. 3, the configuration related to the gamma correction error detection is illustrated, and the illustration of the register circuit 160 and the CRC error detection circuit 180 is omitted.

In the first detailed configuration example, the input image data PXIN is input pixel by pixel to the image processing circuit 100, and the image processing circuit 100 processes the input image data PXIN pixel by pixel.

Figure 4:
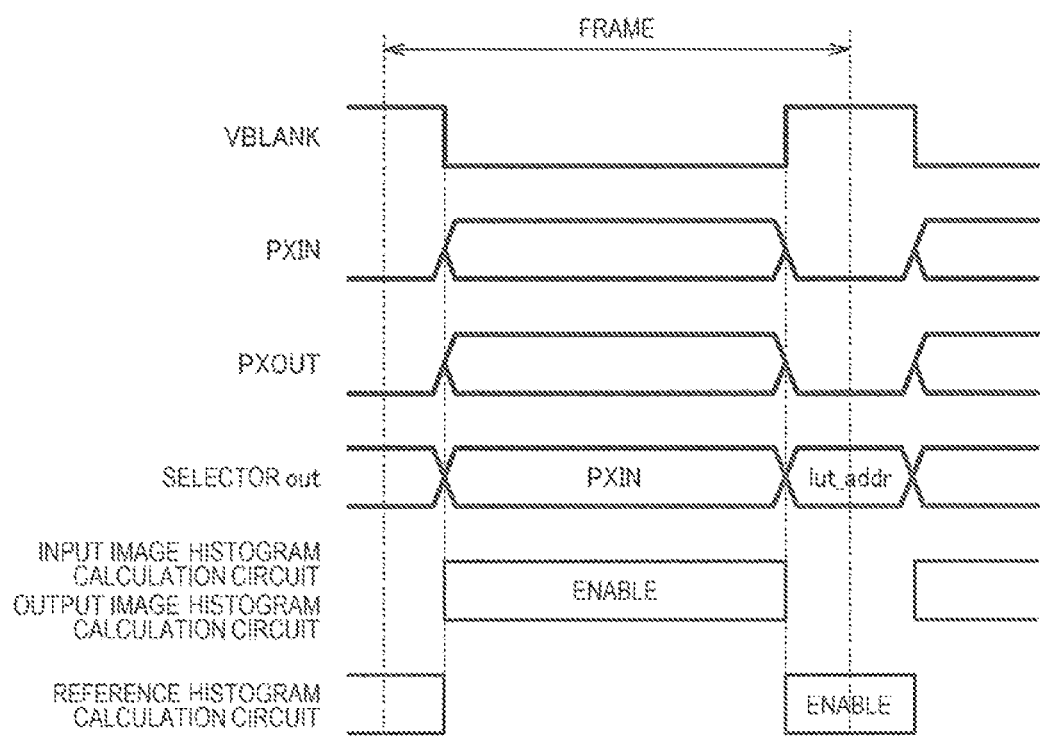
FIG. 4 is a diagram showing an explanatory diagram of an operation of the image processing circuit.

FIG. 4 shows an operation explanation diagram of the image processing circuit 100. A vertical blanking signal VBLANK is a signal representing a valid period and a vertical blanking period, and in the example shown in FIG. 4, VBLANK=0 represents the valid period, and VBLANK=1 represents the vertical blanking period.

First, an operation of the image processing circuit 100 in the valid period will be described. In the valid period, the input image data PXIN is input to the image processing circuit 100 in sequence by a single pixel datum. Further, the operations of the input image histogram calculation circuit 130 and the output image histogram calculation circuit 120 are enabled when VBLANK=0 is true.

To the selector 190, there are input the pixel data in the input image data PXIN, LUT address data lut_addr from the reference histogram calculation circuit 140, and the vertical blanking signal VBLANK. The selector 190 selects one of the pixel data in the input image data PXIN and the LUT address data lut_addr in accordance with the vertical blanking signal VBLANK. In the valid period in which VBLANK=0 is true, the selector 190 selects the pixel data in the input image data PXIN and then outputs the pixel data as output data "out."

To the gamma correction circuit 110, there are input the output data "out" from the selector 190 as input data data_in. The gamma correction circuit 110 performs the gamma correction on the grayscale values of the input data data_in using the look-up table 162. In other words, the gamma correction circuit 110 converts the grayscale values of the input data data_in using the look-up table 162, and then outputs output data data_out of the grayscale values which have been converted. The output data data_out are output as the pixel data in the output image data PXOUT. It should be noted that when assuming the RGB image data and the 256 grayscale levels in each color, the data size of the look-up table 162 is 3×256×8 bits.

To the output image histogram calculation circuit 120, there are input the output data data_out from the gamma correction circuit 110. The output image histogram calculation circuit 120 accumulates the number of pixels of each of the grayscale values based on the pixel data input in sequence by a single pixel datum. In other words, when the grayscale value of the pixel data is x, the output image histogram calculation circuit 120 increments the number of pixels having the grayscale value x by one, and by repeating this process with respect to the output image data PXOUT corresponding to one frame, the output image histogram HISOUT is calculated. The output image histogram calculation circuit 120 is realized by, for example, accumulators, and a memory or a register for storing the number of pixels of each of the grayscale values. When the image data corresponding to one frame fulfill, for example, the number of horizontal pixels of 4 k, RGB image data, and 256 grayscale levels in each of the colors, 3×24 bits of accumulators are used, and the data size of the histogram becomes 3×256×24 bits. The number "3" represents the number of the colors, the number "256" represents the number of grayscale levels, and the number "24" represents the number of bits when describing the maximum value of 1 bin with a binary number.

To the input image histogram calculation circuit 130, there are input the pixel data in the input image data PXIN. The output image histogram calculation circuit 130 accumulates the number of pixels of each of the grayscale values based on the pixel data input in sequence by a single pixel datum to thereby calculate the input image histogram HISIN. The specific calculation method is substantially the same as that of the output image histogram HISOUT. The input image histogram calculation circuit 130 is realized by, for example, accumulators, and a memory or a register for storing the number of pixels of each of the grayscale values. The size of the accumulators is the same as that of the accumulators of the output image histogram calculation circuit 120, and the data size of the input image histogram HISIN is the same as the data size of the output image histogram HISOUT.

Then, an operation of the image processing circuit 100 in the vertical blanking period will be described. The operation of the reference histogram calculation circuit 140 is enabled when VBLANK=1 is true.

The reference histogram calculation circuit 140 outputs the LUT address data lut_addr for designating an input grayscale value i. Here, the number of grayscale levels of each of the colors is assumed to be 256, and i=0, 1, 2, . . . , 255 is assumed. The reference histogram calculation circuit 140 outputs lut_addr=0, then outputs lut_addr=1, and this process is sequentially repeated until lut_addr=255 becomes true. The reference histogram calculation circuit 140 performs the repeat of lut_addr=0 through 255 for each of the colors.

When VBLANK=1 is true, the selector 190 selects the LUT address data lut_addr=i as a second input in2, and then outputs the LUT address data lut_addr=i as the output data "out."

To the gamma correction circuit 110, there is input the LUT address data lut_addr=i from the selector 190 as the input data data_in. The gamma correction circuit 110 converts the LUT address data lut_addr=i as the input data data_in using the look-up table 162, and then outputs the output data data_out of the grayscale values which have been converted. The grayscale value which has been converted is defined as y.

To the reference histogram calculation circuit 140, there is input the output data data_out=y as LUT output data lut=y. The reference histogram calculation circuit 140 calculates the reference histogram HISREF based on the LUT address data lut_addr=i, the LUT output data lut=y, and the input image histogram HISIN. Specifically, the reference histogram calculation circuit 140 calculates the reference histogram HISREF using the following formula (1). The following formula (1) means that the right-hand side is calculated, and then the result is substituted into the left-hand side.

$$HISREF(y)=HISREF(y)+HISIN(i) \quad (1)$$

HISREF(y) represents the number of pixels having the grayscale value of y in the reference histogram HISREF. HISIN(i) represents the number of pixels having the grayscale value of i in the input image histogram HISIN. The reference histogram calculation circuit 140 calculates the above formula (1) in sequence in i=0, 1, 2, . . . , 255, and then performs the calculation for each of the colors to thereby calculates the reference histogram HISREF. The reference histogram calculation circuit 140 is realized by, for example, accumulators for calculating the above formula (1), and a memory or a register for storing the number of pixels of each of the grayscale values. The size of the accumulators is the same as that of the accumulators of the output image histogram calculation circuit 120, and the data size of the reference histogram HISREF is the same as the data size of the output image histogram HISOUT.

The histogram comparison circuit 150 compares the output image histogram HISOUT calculated in the valid period, and the reference histogram HISREF calculated in the vertical blanking period with each other. For example, when the output image histogram HISOUT and the reference histogram HISREF match each other, GMERR=0 is output, and when they fail to match each other, GMERR=1 is output. The histogram comparison circuit 150 compares the bins corresponding to each of the output image histogram HISOUT and the reference histogram HISREF with each other, and when any one of the bins fails to match, the histogram comparison circuit 150 determines that an error has occurred in the gamma correction. This comparison is performed after the reference histogram HISREF is calculated, and is performed in, for example, the vertical blanking period in which the reference histogram HISREF as the comparison target is calculated.

In the present embodiment described hereinabove, taking the vertical blanking signal VBLANK representing the vertical blanking period as a trigger, the reference histogram calculation circuit 140 calculates the reference histogram HISREF, and the histogram comparison circuit 150 performs the comparison.

According to the present embodiment, since the reference histogram HISREF is calculated in the vertical blanking period, the reference histogram HISREF is calculated at a different timing from the timing of the gamma correction performed in the valid period. Thus, when a transient error has occurred in either one of the valid period and the vertical blanking period, an influence of the transient error appears in the output image histogram HISOUT or the reference histogram HISREF, and therefore, by comparing these histograms with each other, it is possible to detect the transient error. Further, according to the present embodiment, since the reference histogram HISREF is calculated in the vertical blanking period which is longer than the horizontal blanking period, it is easy to ensure the processing time for calculating the reference histogram HISREF.

It should be noted that the expression that "taking the blanking signal as a trigger" means that a switching timing from the valid period to the blanking period represented by the blanking signal is used as the trigger, namely that the timing at which the logic level of the blanking signal makes the transition is used as the trigger. For example, in FIG. 4, the timing at which the vertical blanking signal VBLANK has made the transition from a low level to a high level is used as the trigger.

Further, in the present embodiment, the input image histogram calculation circuit 130 calculates the input image histogram HISIN in the valid period in which the input image data PXIN is input.

According to the present embodiment, by the input image histogram HISIN being calculated in the valid period, it is possible to calculate the reference histogram HISREF from the input image histogram HISIN in the blanking period.

Figure 5:
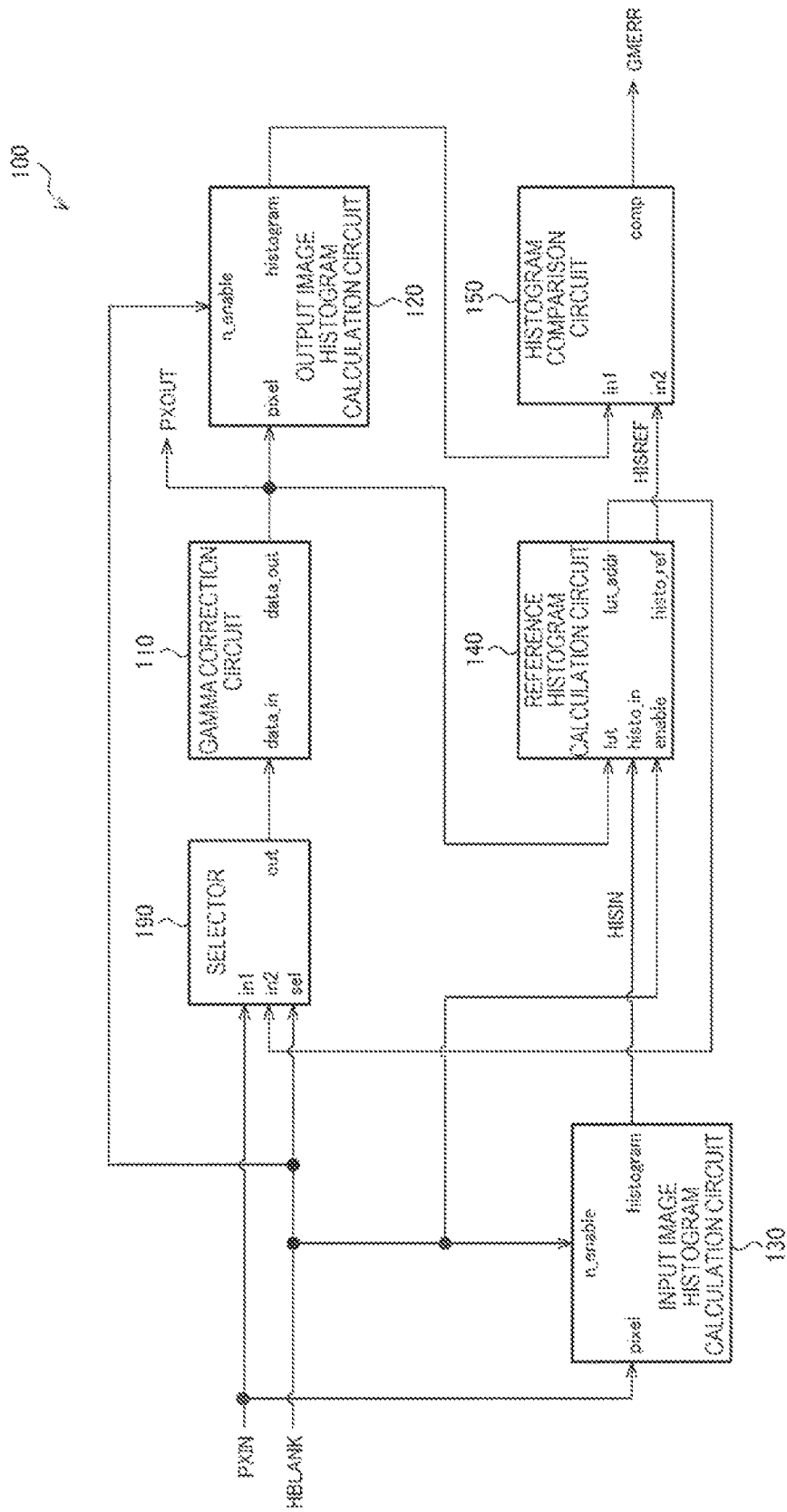
FIG. 5 is a diagram showing a second detailed configuration example of the image processing circuit.

FIG. 5 shows a second detailed configuration example of the image processing circuit 100. The second detailed configuration example is different from the first detailed configuration example in the point that the reference histogram HISREF is calculated in the horizontal blanking period, and the gamma correction error detection is performed every single horizontal scanning line. Hereinafter, a portion in which the second detailed configuration example is different from the first detailed configuration example will mainly be described.

A horizontal blanking signal HBLANK is a signal representing a valid period and a horizontal blanking period, and HBLANK=0 represents the valid period, and HBLANK=1 represents the horizontal blanking period.

The operations of the input image histogram calculation circuit 130 and the output image histogram calculation circuit 120 are enabled in the valid period in which HBLANK=0 is true. The operation of the reference histogram calculation circuit 140 is enabled in the horizontal blanking period in which HBLANK=1 is true. The selector 190 selects one of the pixel data in the input image data PXIN and the LUT address data lut_addr in accordance with the horizontal blanking signal HBLANK. The selector 190 selects the pixel data in the input image data PXIN in the valid period in which the HBLANK=0 is true, and selects the LUT address data lut_addr in the horizontal blanking period in which HBLANK=1 is true. The operations when the circuits are enabled are substantially the same as in the first detailed configuration example.

When the image data corresponding to one frame fulfill, for example, the number of horizontal pixels of 4 k, RGB image data, and 256 grayscale levels in each of the colors, the size of the accumulator becomes 3×13 bits, and the data size of the histogram becomes 3×256×13 bits. The number "3" represents the number of the colors, the number "256" represents the number of grayscale levels, and the number "13" represents the number of bits when describing the maximum value of 1 bin with a binary number.

In the present embodiment described hereinabove, taking the horizontal blanking signal HBLANK representing the horizontal blanking period as a trigger, the reference histogram calculation circuit 140 calculates the reference histogram HISREF, and the histogram comparison circuit 150 performs the comparison.

According to the present embodiment, since the reference histogram HISREF is calculated in the horizontal blanking period, the reference histogram HISREF is calculated at a different timing from the timing of the gamma correction performed in the valid period. Thus, when a transient error has occurred in either one of the valid period and the horizontal blanking period, an influence of the transient error appears in the output image histogram HISOUT or the reference histogram HISREF, and therefore, by comparing these histograms with each other, it is possible to detect the transient error. According to the present embodiment, since the histogram is calculated every single horizontal scanning line, the data size of the histogram decreases compared to the first detailed configuration example in which the histogram is calculated every single frame. Thus, it is possible save the storage area of the memory or the register for storing the histogram.

Figure 6:
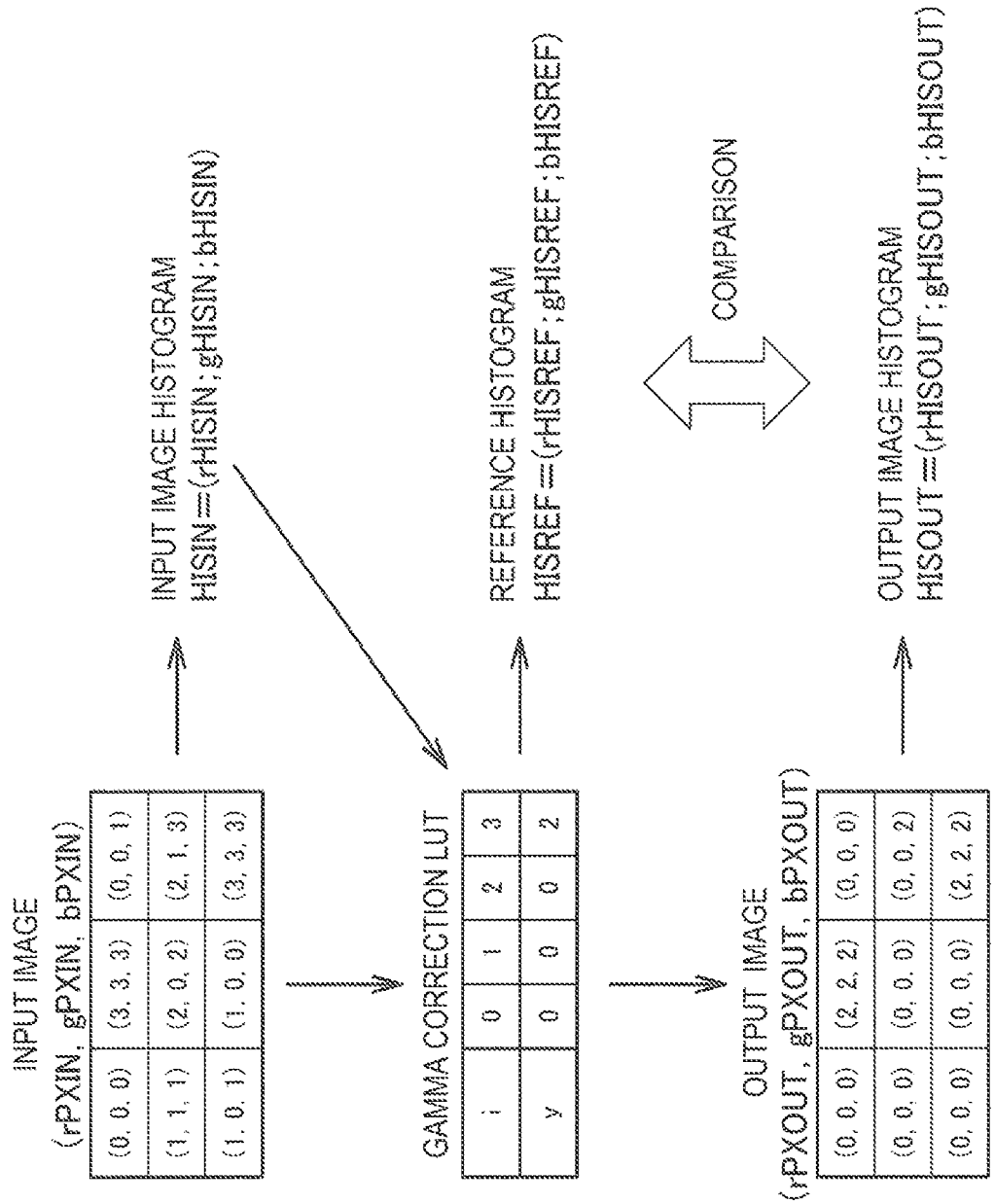
FIG. 6 is a diagram showing a specific example of gamma correction error detection.
Figure 7:
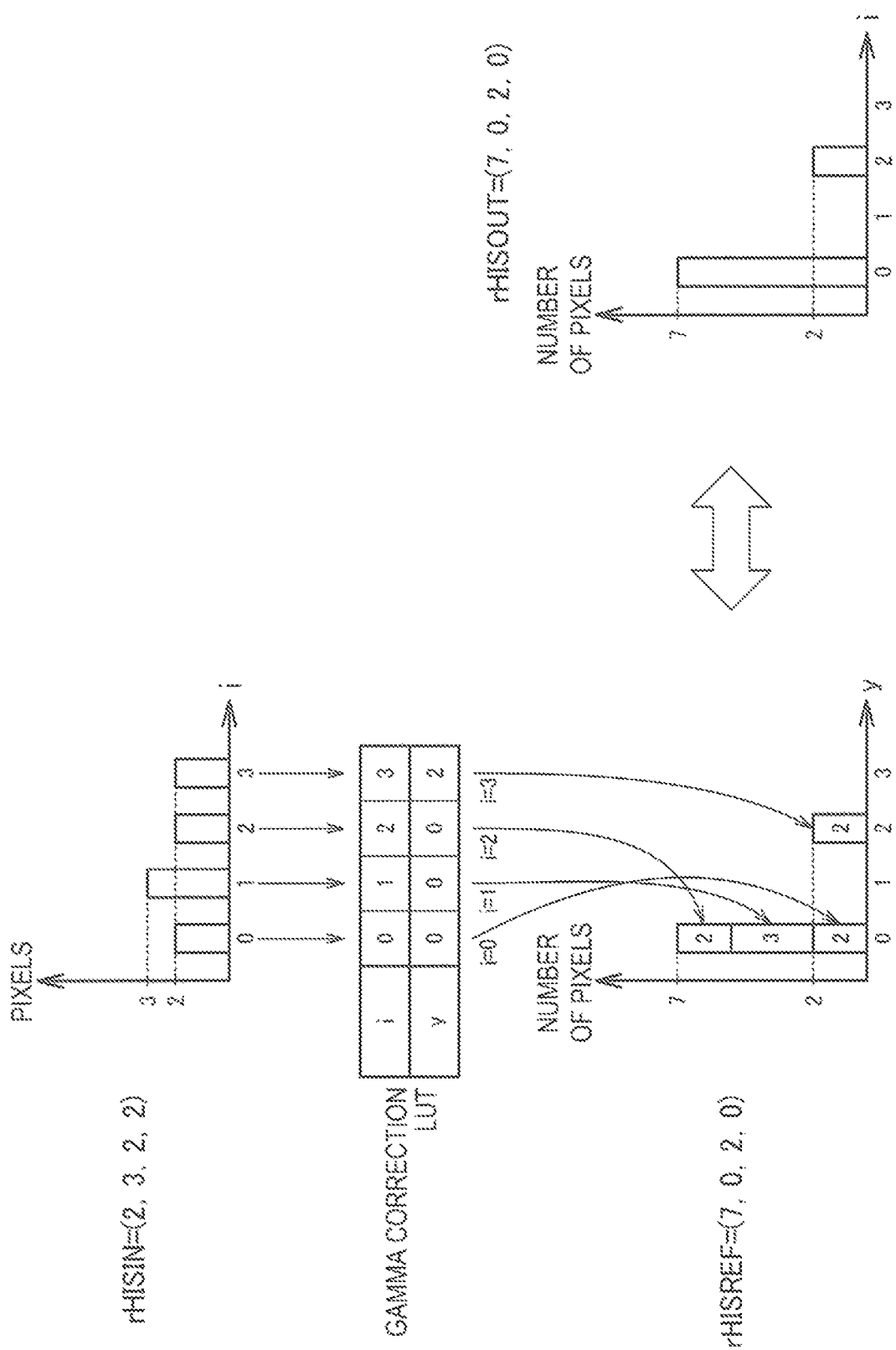
FIG. 7 is a diagram showing the specific example of the gamma correction error detection.

FIG. 6 and FIG. 7 show a specific example of the gamma correction error detection. As shown in an upper left part of FIG. 6, it is assumed that the input image data PXIN are image data formed of 3×3 pixels. Each pixel has an R pixel datum rPXIN, a G pixel datum gPXIN, and a B pixel datum bPXIN, and is described as (rPXIN, gPXIN, bPXIN). Each of the pixel data is formed of 2 bits, and the grayscale value is one of 0 through 3.

As shown in a middle left part of FIG. 6, the look-up table of the gamma correction converts the input grayscale value i=0, 1, 2, 3 into the output grayscale value y=0, 0, 0, 2, respectively. When describing the output grayscale value corresponding to the input grayscale value i as y=LUT(i), LUT(0)=LUT(1)=LUT(2)=0, and LUT(3)=2 are obtained.

As shown in a lower left part of FIG. 6, the output image data PXOUT are the image data formed of 3×3 pixels similarly to the input image data PXIN, each pixel has pixel data (rPXOUT, gPXOUT, bPXOUT), each of the pixel data is formed of 2 bits, and the grayscale value is one of 0 through 3. By converting (rPXIN, gPXIN, bPXIN) using the look-up table, it is possible to obtain (rPXOUT, gPXOUT, bPXOUT).

As shown in a lower right part of FIG. 6, the output image histogram HISOUT is constituted by an R histogram rHISOUT, a G histogram gHISOUT, and a B histogram bHISOUT, and is described as HISOUT=(rHISOUT; gHISOUT; bHISOUT). The R histogram rHISOUT is the histogram of the R pixel datum rPXOUT in the output image data PXOUT, and has four bins of the grayscale values of 0 through 3. Similarly, the G histogram gHISOUT and the B histogram bHISOUT are the histograms of the G, B pixel data gPXOUT, bPXOUT in the output image data PXOUT, and each have four bins. The output image histogram HISOUT obtained by combining those histograms becomes to have the 3×4 bins as a result.

FIG. 7 illustrates the processing on the R pixel shown in FIG. 6 as an example. As shown in a lower right part of FIG. 7, rHISOUT=(7, 0, 2, 0) is obtained from rPXOUT shown in a lower left part of FIG. 6. The numerical values in the parentheses are the numbers of pixels having the grayscale values 0, 1, 2, 3, from the left side. Specifically, rHISOUT(0)=7, rHISOUT(1)=0, rHISOUT(2)=2, and rHISOUT(3)=0 are obtained.

As shown in an upper right part of FIG. 6, similarly to the output image histogram HISOUT, the input image histogram HISIN is described as HISIN=(rHISIN; gHISIN; bHISIN). The R histogram rHISIN is the histogram of the R pixel datum rPXIN in the input image data PXIN, and has four bins of the grayscale values of 0 through 3. Similarly, the G histogram gHISIN and the B histogram bHISIN are the histograms of the G, B pixel data gPXIN, bPXIN in the input image data PXIN, and each have four bins. The input image histogram HISIN obtained by combining those histograms becomes to have the 3×4 bins as a result.

As shown in a middle right part of FIG. 6, similarly to the output image histogram HISOUT, the reference histogram HISREF is described as HISREF=(rHISREF; gHISREF; bHISREF). The histogram rHISREF is a histogram calculated from rHISIN, and has four bins of the grayscale values of 0 through 3. Similarly, the histograms gHISREF, bHISREF are histograms calculated from gHISIN, bHISIN, respectively, and each have four bins of the grayscale values of 0 through 3. The reference histogram HISREF obtained by combining those histograms becomes to have the 3×4 bins as a result.

As shown in an upper part of FIG. 7, rHISIN=(2, 3, 2, 2) is obtained from rPXIN shown in the upper left part of FIG. 6. The numerical values in the parentheses are the numbers of pixels having the grayscale values 0, 1, 2, 3, from the left side. Specifically, rHISIN(0)=2, rHISIN(1)=3, rHISIN(2)=2, and rHISIN(3)=2 are obtained.

As described with reference to S5 in FIG. 2, the reference histogram HISREF is initialized. Specifically, before calculating the reference histogram HISREF, rHISREF(0)=rHISREF(1)=rHISREF(2)=rHISREF(3)=0 is set.

When i=0 is set, y=LUT(0)=0 can be obtained from the look-up table. On this occasion, the following formula (2) is obtained from the above formula (1).

$$rHISREF(0)=rHISREF(0)+rHISIN(0)=0+2=2 \quad (2)$$

When i=1 is set, y=LUT(1)=0 can be obtained from the look-up table. On this occasion, the following formula (3) is obtained from the above formula (1).

$$rHISREF(0)=rHISREF(0)+rHISIN(1)=2+3=5 \quad (3)$$

When i=2 is set, y=LUT(2)=0 can be obtained from the look-up table. On this occasion, the following formula (4) is obtained from the above formula (1).

$$rHISREF(0)=rHISREF(0)+rHISIN(2)=5+2=7 \quad (4)$$

When i=3 is set, y=LUT(3)=2 can be obtained from the look-up table. On this occasion, the following formula (5) is obtained from the above formula (1).

$$rHISREF(2)=rHISREF(2)+rHISIN(3)=0+2=2 \quad (5)$$

rHISREF=(7, 0, 2, 0) is obtained from the above formulas (2) through (5). FIG. 7 shows an example in which the gamma correction is normal, and rHISREF=(7, 0, 2, 0) and rHISOUT=(7, 0, 2, 0) match each other. When an error occurs in the gamma correction or the reference histogram calculation, rHISREF and rHISOUT do not match each other. It should be noted that although the calculation and the comparison of the R histogram are described here, the calculation and the comparison of the G histogram and the B histogram are also performed in substantially the same manner.

In the present embodiment described hereinabove, the look-up table 162 is a table for making the input grayscale value i and the output grayscale value y correspond to each other in the gamma correction. It is assumed that k is an integer no smaller than 2, the output grayscale values corresponding to the input grayscale values i=i1, i2, . . . , ik fulfill LUT(i1)=LUT(i2)= . . . =LUT(ik)=y, and in the input image histogram HISIN, the numbers of pixels having the grayscale values i1, i2, . . . , ik are HISIN(i1), HISIN(i2), . . . , HISIN(ik), respectively. In this case, the reference histogram calculation circuit 140 obtains the number of pixels HISREF(y) having the grayscale value y using the formula HISREF(y)=HISIN(i1)+HISIN(i2)+ . . . +HISIN(ik) to thereby calculate the reference histogram HISREF.

In the example shown in FIG. 6 and FIG. 7, i1=0, i2=1, i3=2, k=3, and LUT(0)=LUT(1)=LUT(2)=0 are assumed. In this case, as represented by the above formulas (2) through (4), the following is obtained. rHISREF(0)=rHISIN(0)+rHISIN(1)+rHISIN(2)=2+3+2=7.

According to the present embodiment, the grayscale value i is converted into the grayscale value y=LUT(i) using the look-up table 162, and the number of pixels HISIN(i) corresponding to the grayscale value i which has not been converted in the input image histogram HISIN is accumulated as the number of pixels HISREF(y) corresponding to the grayscale value y=LUT(i) which has been converted in the reference histogram HISREF. Thus, it is possible to calculate the reference histogram HISREF as the expected value of the output image histogram HISOUT using the look-up table 162.

Further, in the present embodiment, n is defined as an integer no smaller than 2, i=1, 2, . . . , n is assumed, an output grayscale value when the input grayscale value is i is defined as LUT(i), the number of pixels having the grayscale value i in the input image histogram HISIN is defined as HISIN(i), and the number of pixels having the grayscale value LUT(i) in the reference histogram HISREF is defined as HISREF (LUT(i)). In this case, the reference histogram calculation circuit 140 selects the grayscale value i and outputs the grayscale value i to the gamma correction circuit 110 as the input grayscale value, and the output grayscale value LUT(i) is input to the reference histogram calculation circuit 140 from the gamma correction circuit 110. The reference histogram calculation circuit 140 adds the number of pixels HISIN(i) in the input image histogram to the number of pixels HISREF(LUT(i)) in the reference histogram.

According to the present embodiment, by the reference histogram calculation circuit 140 sequentially selecting the grayscale values i=1, 2, . . . , n, the numbers of pixels HISIN(i) in the input image histogram are sequentially accumulated in the numbers of pixels HISREF(LUT(i)) in the reference histogram. For example, when the number of the grayscale values is 256, it is possible to calculate the reference histogram HISREF by performing the accumulation 256 times, and the calculation of the reference histogram HISREF can be completed in the blanking period.

Further, in the present embodiment, the image processing circuit 100 includes the selector 190. The selector 190 selects one of the input image data PXIN and the grayscale value i to be output by the reference histogram calculation circuit 140 based on the blanking signal as one of the vertical blanking signal VBLANK and the horizontal blanking signal HBLANK. When the blanking signal indicates the valid period, the selector 190 selects the input image data PXIN to output the input image data PXIN to the gamma correction circuit 110, and the gamma correction circuit 110 outputs the output image data PXOUT. When the blanking signal indicates the blanking period, the reference histogram calculation circuit 140 outputs the grayscale value i, the selector 190 selects the grayscale value i to output the grayscale value i to the gamma correction circuit 110 as the input grayscale value, and the gamma correction circuit 110 outputs the output grayscale value LUT(i) to the reference histogram calculation circuit 140.

According to the present embodiment, the gamma correction is performed, and at the same time, the output image histogram HISOUT and the input image histogram HISIN are calculated in the valid period, and in the blanking period, the reference histogram HISREF is calculated from the input image histogram HISIN, and the reference histogram HISREF and the output image histogram HISOUT are compared with each other. In such a manner, the reference histogram calculation and the histogram comparison are performed using the vertical blanking signal VBLANK or the horizontal blanking signal HBLANK as a trigger.

3. Circuit Device and Electronic Apparatus

Figure 8:
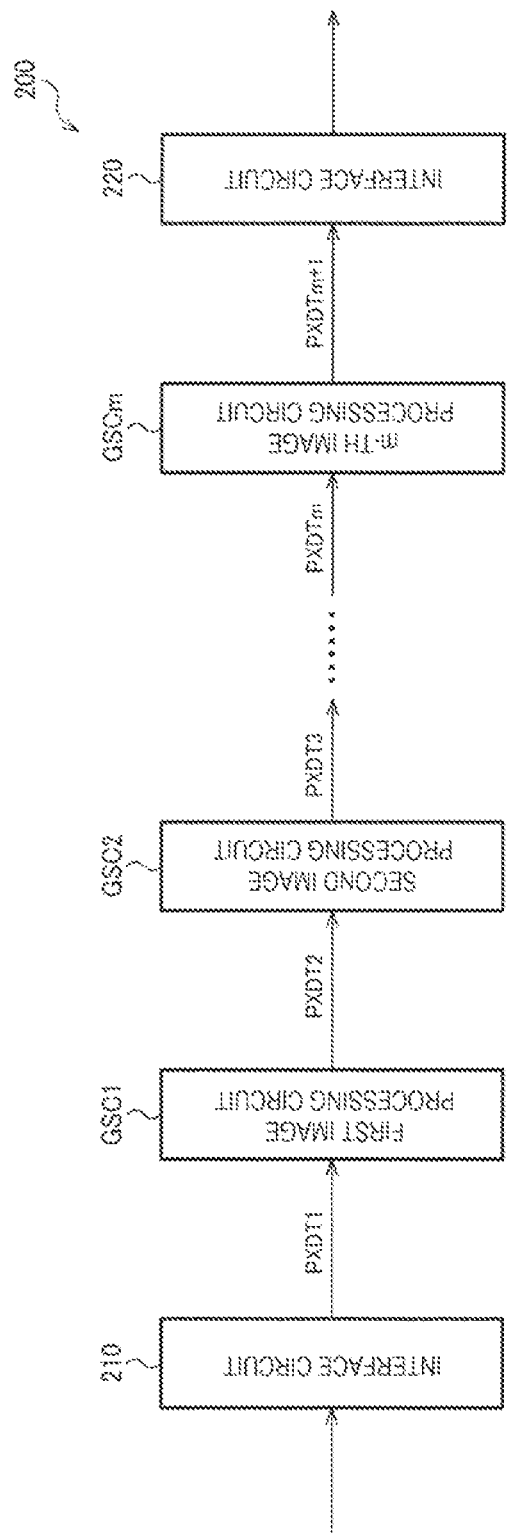
FIG. 8 is a diagram showing a configuration example of a circuit device.

FIG. 8 shows a configuration example of a circuit device 200 including the image processing circuit 100. The circuit device 200 includes an interface circuit 210, first through m-th image processing circuits GSC1 through GSCm, and an interface circuit 220. The character m is an integer no smaller than 1. The circuit device 200 is, for example, an integrated circuit device having a plurality of circuit elements integrated in a semiconductor substrate.

The interface circuit 210 receives image data from a processing device in the outside of the circuit device 200, and then outputs image data PXDT1 thus received. The interface circuit 210 can include a receiving circuit for a variety of communication interfaces, and includes, as an example, a receiving circuit compliant with LVDS, DVI, Display Port, GMSL, or GVIF. LVDS is an abbreviation of Low Voltage Differential Signaling, DVI is an abbreviation of Digital Visual Interface, GMSL is an abbreviation of Gigabit Multimedia Serial Link, and GVIF is an abbreviation of Gigabit Video Interface.

The first through m-th image processing circuits GSC1 through GSCm constitute an image processing pipeline for performing pipeline processing of a variety of image processing. One of the first through m-th image processing circuits GSC1 through GSCm corresponds to the image processing circuit 100 shown in FIG. 1, FIG. 3, or FIG. 5. The first through m-th image processing circuits GSC1 through GSCm perform the pipeline processing on the image data PXDT1 to output image data PXDTm+1. The image processing circuits GSC1, GSC2, . . . , GSCm perform the image processing on the image data PXDT1, PXDT2, . . . , PXDTm to output the image data PXDT2, PXDT3, . . . , PXDTm+1, respectively.

The interface circuit 220 transmits the image data PXDTm+1 to a device in a posterior stage of the circuit device 200. The interface circuit 220 can include a transmitting circuit for a variety of communication interfaces, and includes, as an example, a transmitting circuit compliant with LVDS, DVI, Display Port, GMSL, or GVIF.

Figure 9:
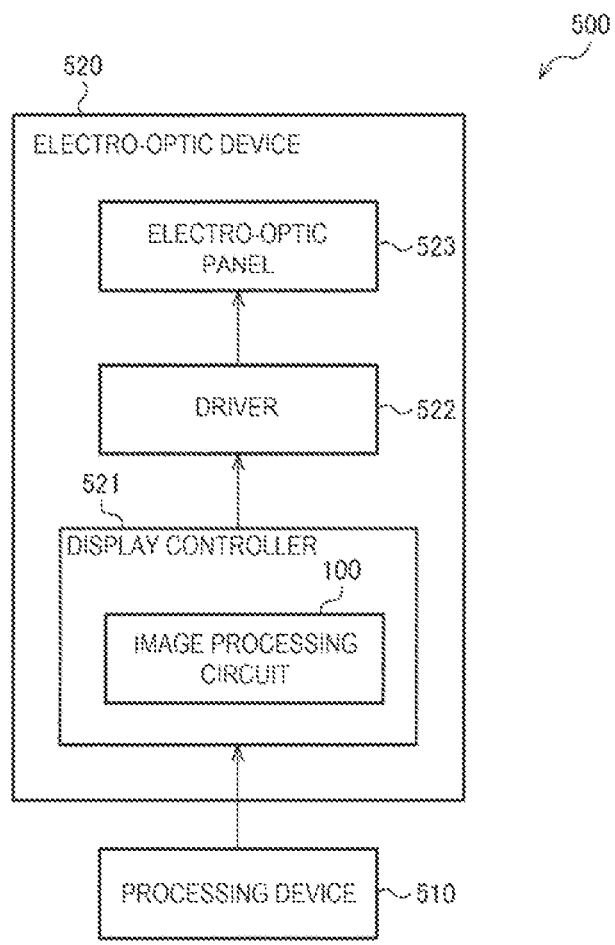
FIG. 9 is a diagram showing a first configuration example of an electronic apparatus.

FIG. 9 shows a first configuration example of an electronic apparatus 500 to which the image processing circuit 100 is applied. The electronic apparatus 500 includes a processing device 510 and an electro-optic device 520.

The electro-optic device 520 is a liquid crystal display, an EL display, or the like. EL is an abbreviation of Electro Luminescence. The electronic apparatus 500 can be a variety of apparatuses equipped with the display described above, and is, as an example, a display provided to an in-car cluster panel, an information processing device such as a personal computer, or a portable information processing terminal such as a tablet terminal.

The electro-optic device 520 includes a display controller 521, a driver 522, and an electro-optic panel 523. The processing device 510 is a CPU, a microcomputer, a DSP, or the like, and transmits image data of a display image to the display controller 521. The display controller 521 performs image processing on the image data, and then outputs display control signals to the driver 522 together with the image data as the result of the image processing. The display controller 521 includes the image processing circuit 100, and performs the gamma correction, the gamma correction error detection, and the register error detection in the image processing on the image data described above. The display control signals are, for example, a vertical sync signal, a horizontal sync signal, and a pixel clock signal. The driver 522 drives the electro-optic panel 523 based on the image data and the display control signals thus received.

Figure 10:
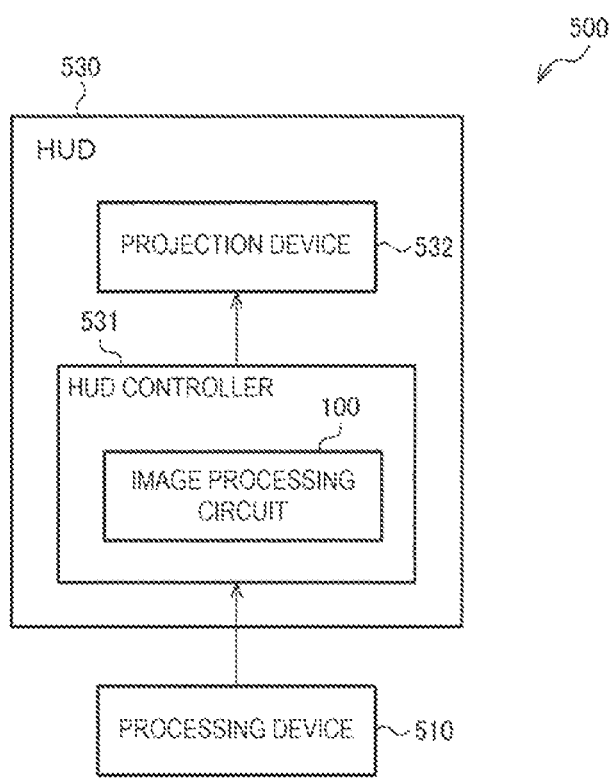
FIG. 10 is a diagram showing a second configuration example of an electronic apparatus.

FIG. 10 shows a second configuration example of the electronic apparatus 500 to which the image processing circuit 100 is applied. The electronic apparatus 500 includes the processing device 510 and an HUD 530. HUD is an abbreviation of Head Up Display.

The HUD 530 includes an HUD controller 531 and a projection device 532. The processing device 510 transmits the image data of the display image to the HUD controller 531. The HUD controller 531 performs image processing on the image data, and then outputs display control signals to the projection device 532 together with the image data as the result of the image processing. The HUD controller 531 includes the image processing circuit 100, and performs the gamma correction, the gamma correction error detection, and the register error detection in the image processing on the image data described above. The projection device 532 includes, for example, a driver, a liquid crystal panel, a light source, and an optical device. The driver makes the liquid crystal display panel display an image based on the image data and the display control signals received from the HUD controller 531. The light source emits projection light to the liquid crystal display panel, and the projection light transmitted through the liquid crystal display panel enters the optical device. The optical device projects the projection light having been transmitted through the liquid crystal display panel on a screen. The screen is, for example, a windshield of a vehicle, but it is possible to provide a dedicated screen. The vehicle is a car, an airplane, a ship, or a boat.

The image processing circuit according to the present embodiment described hereinabove includes the gamma correction circuit, the output image histogram calculation circuit, the input image histogram calculation circuit, the reference histogram calculation circuit, and the histogram comparison circuit. The gamma correction circuit performs the gamma correction on the input image data using the look-up table, and then outputs the output image data. The output image histogram calculation circuit calculates the output image histogram as the histogram of the output image data. The input image histogram calculation circuit calculates the input image histogram as the histogram of the input image data. Based on the look-up table, the reference histogram calculation circuit calculates the reference histogram as the expected value of the output image histogram from the input image histogram. The histogram comparison circuit performs comparison between the output image histogram and the reference histogram to thereby determine whether or not the gamma correction by the gamma correction circuit is normal.

According to the present embodiment, since the output image histogram is calculated from the output image data on which the gamma correction has been performed, and the reference histogram is calculated from the input image histogram, the output image histogram calculation and the reference histogram calculation are different in signal processing path from each other. Thus, when an abnormality occurs in either of the gamma correction process and the reference histogram calculation, the output image histogram and the reference histogram fail to match each other, and therefore, the abnormality can be detected. Since the detection can dynamically be performed in the gamma correction process on the display image, whether or not the display image has normally been processed can be verified when operating.

Further, in the present embodiment, it is possible for the reference histogram calculation circuit to calculate the reference histogram, and for the histogram comparison circuit to perform the comparison taking the vertical blanking signal representing the vertical blanking period as a trigger.

According to the present embodiment, since the reference histogram is calculated in the vertical blanking period, the reference histogram is calculated at a different timing from the timing of the gamma correction performed in the valid period. Thus, when a transient error has occurred in either one of the valid period and the vertical blanking period, an influence of the transient error appears in the output image histogram or the reference histogram, and therefore, by comparing these histograms with each other, it is possible to detect the transient error. Further, according to the present embodiment, since the reference histogram is calculated in the vertical blanking period which is longer than the horizontal blanking period, it is easy to ensure the processing time for calculating the reference histogram.

Further, in the present embodiment, it is possible for the reference histogram calculation circuit to calculate the reference histogram, and for the histogram comparison circuit to perform the comparison taking the horizontal blanking signal representing the horizontal blanking period as a trigger.

According to the present embodiment, since the reference histogram is calculated in the horizontal blanking period, the reference histogram is calculated at a different timing from the timing of the gamma correction performed in the valid period. Thus, when a transient error has occurred in either one of the valid period and the horizontal blanking period, an influence of the transient error appears in the output image histogram or the reference histogram, and therefore, by comparing these histograms with each other, it is possible to detect the transient error. According to the present embodiment, since the histogram is calculated every single horizontal scanning line, the data size of the histogram decreases compared to when the histogram is calculated every single frame. Thus, it is possible save the storage area of the memory or the register for storing the histogram.

Further, in the present embodiment, it is possible for the input image histogram calculation circuit to calculate the input image histogram in the valid period in which the input image data is input.

According to the present embodiment, by the input image histogram being calculated in the valid period, it is possible to calculate the reference histogram from the input image histogram in the blanking period.

Further, in the present embodiment, the look-up table can be a table for making the input grayscale value and the output grayscale value correspond to each other in the gamma correction. It is assumed that k is an integer no smaller than 2, the output grayscale values corresponding to the input grayscale values i=i1, i2, . . . , ik fulfill LUT(i1)=LUT(i2)= . . . =LUT(ik)=y, and in the input image histogram, the numbers of pixels having the grayscale values i1, i2, . . . , ik are HISIN(i1), HISIN(i2), . . . , HISIN(ik), respectively. In this case, it is possible for the reference histogram calculation circuit to obtain the number of pixels HISREF(y) having the grayscale value y using the formula HISREF(y)=HISIN(i1)+HISIN(i2)+ . . . +HISIN(ik) to thereby calculate the reference histogram.

According to the present embodiment, the grayscale values i1, i2, . . . , ik are converted into the grayscale values LUT(i1)=LUT(i2)= . . . =LUT(ik)=y using the look-up table 163, and the numbers of pixels HISIN(i1), HISIN(i2), . . . , HISIN(ik) corresponding to the grayscale values which have not been converted in the input image histogram are accumulated as the numbers of pixels HISREF(y) corresponding to the grayscale values which have been converted in the reference histogram HISREF. Thus, it is possible to calculate the reference histogram HISREF as the expected value of the output image histogram HISOUT using the look-up table 162.

Further, in the present embodiment, the look-up table can be a table for making the input grayscale value and the output grayscale value correspond to each other in the gamma correction. The character n is defined as an integer no smaller than 2, i=1, 2, . . . , n is assumed, an output grayscale value when the input grayscale value is i is defined as LUT(i), the number of pixels having the grayscale value i in the input image histogram is defined as HISIN(i), and the number of pixels having the grayscale value LUT(i) in the reference histogram is defined as HISREF(LUT(i)). In this case, it is possible to adopt a configuration in which the reference histogram calculation circuit selects the grayscale value i to output the grayscale value i to the gamma correction circuit as the input grayscale value, the output grayscale value LUT(i) is input to the reference histogram calculation circuit from the gamma correction circuit, and the reference histogram calculation circuit adds the number of pixels HISIN(i) in the input image histogram to the number of pixels HISREF(LUT(i)) in the reference histogram.

According to the present embodiment, by the reference histogram calculation circuit sequentially selecting the grayscale values i=1, 2, . . . , n, the numbers of pixels HISIN(i) in the input image histogram are sequentially accumulated in the numbers of pixels HISREF(LUT(i)) in the reference histogram. For example, when the number of the grayscale values is 256, it is possible to calculate the reference histogram by performing the accumulation 256 times, and the calculation of the reference histogram can be completed in the blanking period.

Further, in the present embodiment, the image processing circuit can include the selector. It is possible for the selector to select one of the input image data and the grayscale value i to be output by the reference histogram calculation circuit based on the blanking signal as one of the vertical blanking signal and the horizontal blanking signal. When the blanking signal indicates the valid period, it is possible for the selector to select the input image data to output the input image data to the gamma correction circuit, and for the gamma correction circuit to output the output image data. It is possible to adopt a configuration in which when the blanking signal indicates the blanking period, the reference histogram calculation circuit outputs the grayscale value i, the selector selects the grayscale value i to output the grayscale value i to the gamma correction circuit as the input grayscale value, and the gamma correction circuit outputs the output grayscale value LUT(i) to the reference histogram calculation circuit.

According to the present embodiment, the gamma correction is performed, and at the same time, the output image histogram and the input image histogram are calculated in the valid period, and in the blanking period, the reference histogram is calculated from the input image histogram, and the reference histogram and the output image histogram are compared with each other. In such a manner, the reference histogram calculation and the histogram comparison are performed using the vertical blanking signal or the horizontal blanking signal as a trigger.

Further, in the present embodiment, the image processing circuit can include the register circuit for storing the look-up table, and the CRC error detection circuit for detecting the CRC error of the look-up table stored in the register circuit.

When a permanent error has occurred in the look-up table, the gamma correction and the reference histogram calculation performed based on the look-up table both become abnormal, and there is a possibility that the output image histogram and the reference histogram become the same although abnormal. According to the present embodiment, by the CRC error in the look-up table being detected, it is possible to detect the permanent error in the look-up table.

Further, the circuit device according to the present embodiment includes any one of the image processing circuits described above.

Further, the electronic apparatus according to the present embodiment includes any one of the image processing circuits described above.

It should be noted that although the present embodiment is hereinabove described in detail, it should easily be understood by those skilled in the art that it is possible to make a variety of modifications not substantially departing from the novel matters and the advantages of the present disclosure. Therefore, all of such modified examples should be included in the scope of the present disclosure. For example, a term described at least once with a different term having a broader sense or the same meaning in the specification or the accompanying drawings can be replaced with the different term in any part of the specification or the accompanying drawings. Further, all of the combinations of the present embodiment and the modified examples are also included in the scope of the present disclosure. Further, the configurations and the operations of the image processing circuit, the circuit device, and the electronic apparatus are not limited to those described in the present embodiment, but can be implemented with a variety of modifications.

What is claimed is:

1. An image processing circuit comprising:
    a gamma correction circuit configured to perform a gamma correction on input image data using a look-up table, and then output output image data;
    an output image histogram calculation circuit configured to calculate an output image histogram as a histogram of the output image data;
    an input image histogram calculation circuit configured to calculate an input image histogram as a histogram of the input image data;
    a reference histogram calculation circuit configured to calculate a reference histogram as an expected value of the output image histogram from the input image histogram based on the look-up table; and
    a histogram comparison circuit configured to perform a comparison between the output image histogram and the reference histogram to determine whether or not the gamma correction by the gamma correction circuit is normal.

2. The image processing circuit according to claim 1, wherein
    taking a vertical blanking signal representing a vertical blanking period as a trigger, the reference histogram calculation circuit calculates the reference histogram, and the histogram comparison circuit performs the comparison.

3. The image processing circuit according to claim 1, wherein
    taking a horizontal blanking signal representing a horizontal blanking period as a trigger, the reference histogram calculation circuit calculates the reference histogram, and the histogram comparison circuit performs the comparison.

4. The image processing circuit according to claim 1, wherein
    the input image histogram calculation circuit calculates the input image histogram in a valid period in which the input image data is input.

5. The image processing circuit according to claim 1, wherein
    the look-up table is a table configured to make an input grayscale value and an output grayscale value correspond to each other in the gamma correction,
    assuming that k is an integer no smaller than 2, the output grayscale values corresponding to the input grayscale values $i1, i2, \ldots, ik$ fulfill $LUT(i1)=LUT(i2)=\ldots=LUT(ik)=y$, and in the input image histogram, numbers of pixels having the grayscale values $i1, i2, \ldots, ik$ are $HISIN(i1), HISIN(i2), \ldots, HISIN(ik)$, respectively,
    the reference histogram calculation circuit obtains the number of pixels $HISREF(y)$ having the grayscale value y from a following formula to thereby calculate the reference histogram, $$HISREF(y)=HISIN(i1)+HISIN(i2)+\ldots+HISIN(ik).$$

6. The image processing circuit according to claim 1, wherein
    the look-up table is a table configured to make an input grayscale value and an output grayscale value correspond to each other in the gamma correction,
    assuming n as an integer no smaller than 2, assuming $i=1, 2, \ldots, n$, assuming the output grayscale value when the input grayscale value is i as $LUT(i)$, assuming a number of pixels having the grayscale value i in the input image histogram as $HISIN(i)$, and assuming a number of pixels having a grayscale value $LUT(i)$ in the reference histogram as $HISREF(LUT(i))$,
    the reference histogram calculation circuit selects a grayscale value i to output the grayscale value i to the gamma correction circuit as the input grayscale value, the output grayscale value $LUT(i)$ is input to the reference histogram calculation circuit from the gamma correction circuit, and the reference histogram calculation circuit adds the number of pixels $HISIN(i)$ in the input image histogram to the number of pixels $HISREF(LUT(i))$ in the reference histogram.

7. The image processing circuit according to claim 6, further comprising:
    a selector configured to select one of the input image data and the grayscale value i to be output by the reference histogram calculation circuit based on a blanking signal as one of a vertical blanking signal and a horizontal blanking signal, wherein
    when the blanking signal indicates a valid period, the selector selects the input image data to output the input image data to the gamma correction circuit, and the gamma correction circuit outputs the output image data, and
    when the blanking signal indicates a blanking period, the reference histogram calculation circuit outputs the grayscale value i, the selector selects the grayscale value i to output the grayscale value i to the gamma correction circuit as the input grayscale value, and the gamma correction circuit outputs the output grayscale value $LUT(i)$ to the reference histogram calculation circuit.

8. The image processing circuit according to claim 1, further comprising:
    a register circuit configured to store the look-up table; and
    a CRC error detection circuit configured to detect a CRC error in the look-up table stored in the register circuit.

9. A circuit device comprising:
    the image processing circuit according to claim 1.

10. An electronic apparatus comprising:
    the image processing circuit according to claim 1.

* * * * *